Jan. 2, 1962     E. B. LUTTRELL     3,015,211
RADIAL TURBINE ENGINE

Filed Nov. 23, 1959     3 Sheets-Sheet 1

INVENTOR.
Earl B. Luttrell

INVENTOR.
Earl B. Luttrell

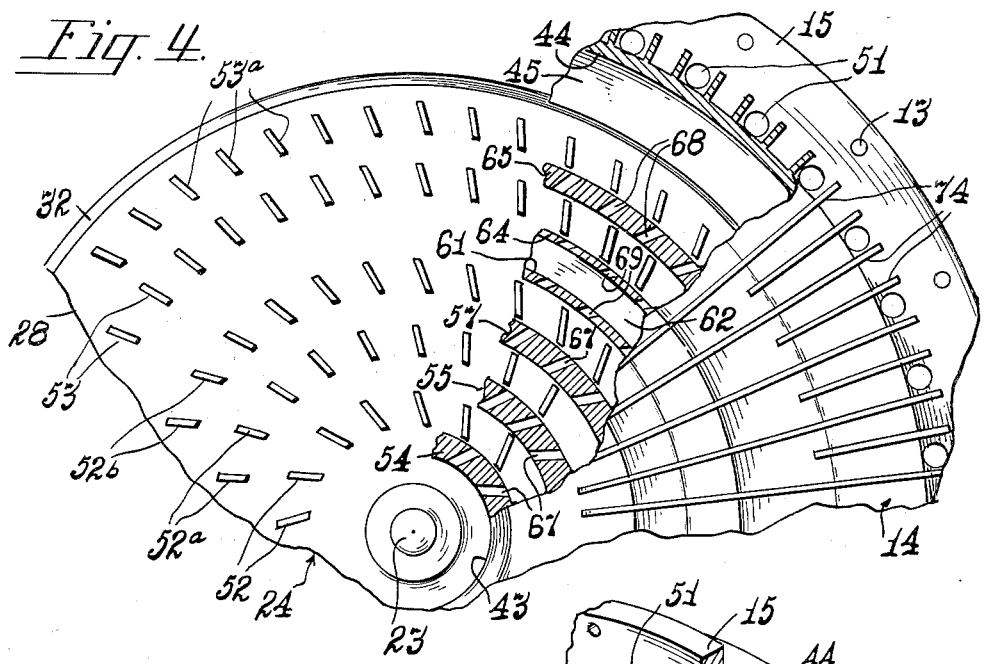

3,015,211
RADIAL TURBINE ENGINE
Earl B. Luttrell, Sandwich, Ill., assignor to Luttrell Engineering Corp., Sandwich, Ill., a corporation of Illinois
Filed Nov. 23, 1959, Ser. No. 854,924
11 Claims. (Cl. 60—39.36)

This invention relates to improvements in internal combustion turbine engines and more particularly to a self-contained radial concentric stage supercharged internal combustion turbine engine.

More particularly the engine embodying the present invention is characterized by its inclusion of a single disc impeller wheel with concentric compression and power exhaust stages. The structure and assembly of the engine is such that a supply of atmosphere is constantly supplied to and pressurized by the impeller wheel for delivery to the intake of the turbine compressor in a manner to absorb heat from the exhaust gases and thus be pre-heated prior to its entrance into the turbine compressor. The turbine compressor, which is partly comprised of the impeller wheel, functions to further pressurize the preheated air and deliver it radially into a concentric combustion chamber having a fuel injector and an igniter associated therewith. Pressurized exhaust gases of the ignited air-fuel mixture are discharged radially against power turbine blades on the impeller wheel for driving same, and are discharged radially into an exhaust collector chamber arranged in the path of incoming air and then discharged to atmosphere.

More specifically, the impeller wheel has centrifugal means thereon to propel atmospheric air radially from the region of its axial area into a peripheral circumferential collection chamber. The air is preheated during its travel to said chamber and is pressurized. The preheated pressurized air from said chamber flows around a circumferential exhaust chamber thus becoming further heated by heat transfer from the exhaust chamber and flows inwardly radially to an axially located intake to a multi-stage radial flow compressor formed in part by the impeller wheel, is further pressurized and then delivered into a circumferential combustion chamber where it is mixed with fuel delivered by a fuel injector. The hot high pressure gases generated in the combustion chamber upon ignition of the fuel-air mixture therein are discharged outwardly radially against power turbine blades carried by the impeller wheel for driving said wheel and are discharged radially into the exhaust gas collector and ultimately to atmosphere after being partially cooled by the flow of pressurized atmospheric air flowing therearound as noted hereinabove.

It is therefore an object of the invention to provide a radial concentric stage internal combustion turbine engine of the character referred to.

Another object is to provide an engine of the character herein disclosed with novel means to preheat incoming atmosphere prior to its flow into the air compressor.

Another object is to provide multi-stage means for pressurizing air in the intake of a radial internal combustion turbine engine.

Another object is to provide a novelly constructed impeller wheel or disc.

Another object is to provide a novel method and means, in a turbine engine, for transferring heat from the exhaust gases to incoming air for preheating said air.

Another object is to provide a radial internal combustion turbine engine with common rotary means for pressurizing incoming atmosphere prior to its admission into the turbine compressor portion of said means.

Another object is to provide a stationary stator with a series of concentric parallel grooves interconnected by radially angled nozzles adapted to direct air and exhaust gases flowing therethrough in a circumferential inclined direction radially against impeller vanes and power turbine blades operably arranged in said grooves.

Another object is to provide a multi-stage radial internal combustion turbine engine with a circumferential exhaust collector to receive expended gases from the last stage of the power turbine portion of said engine.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 4 is a fragmentary sectional view taken substantially on line 4—4 of FIG. 1, showing parts broken away.

FIG. 5 is a fragmentary sectional perspective view of the impeller wheel.

FIG. 6 is a fragmentary sectional perspective view of the stator.

Figure 1:
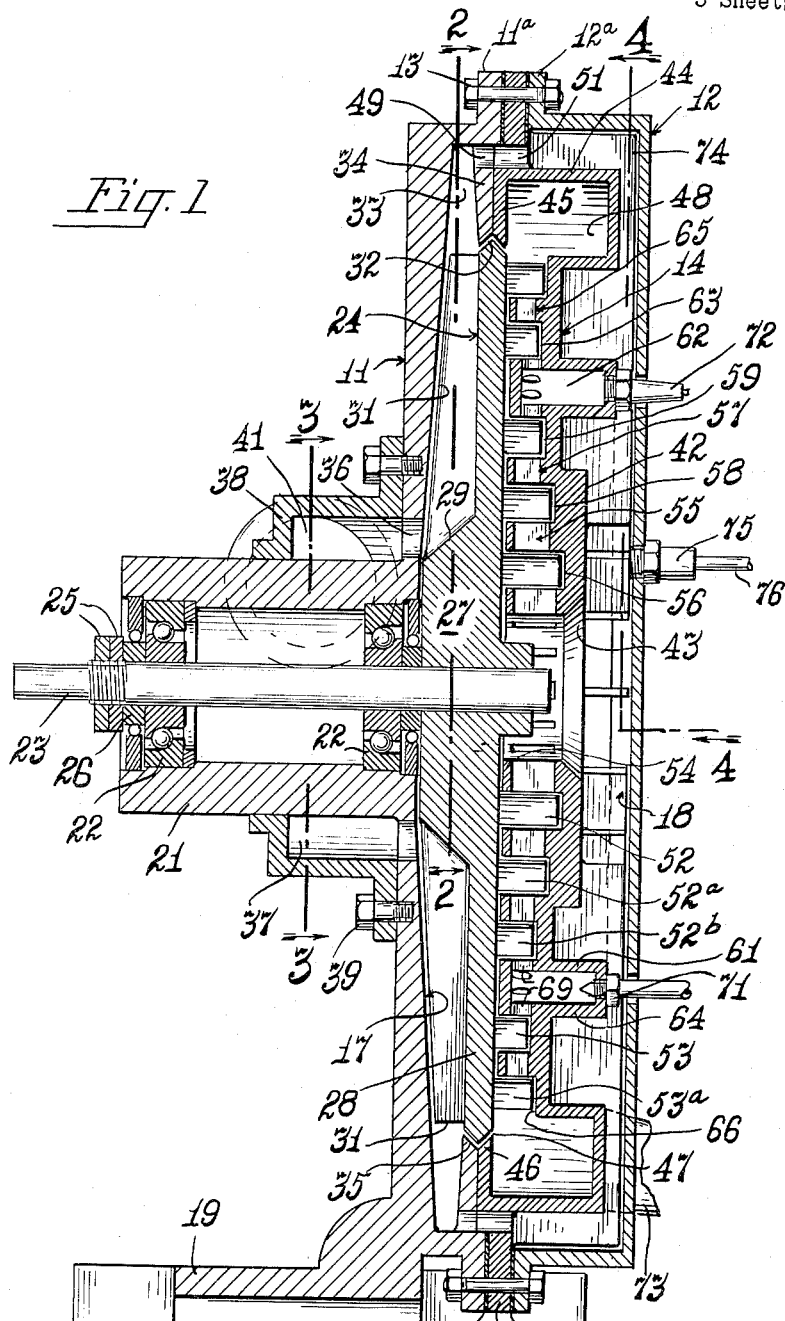
FIG. 1 is a vertical central sectional view of a radial concentric multi-stage internal combustion turbine engine embodying the invention.
Figure 2:
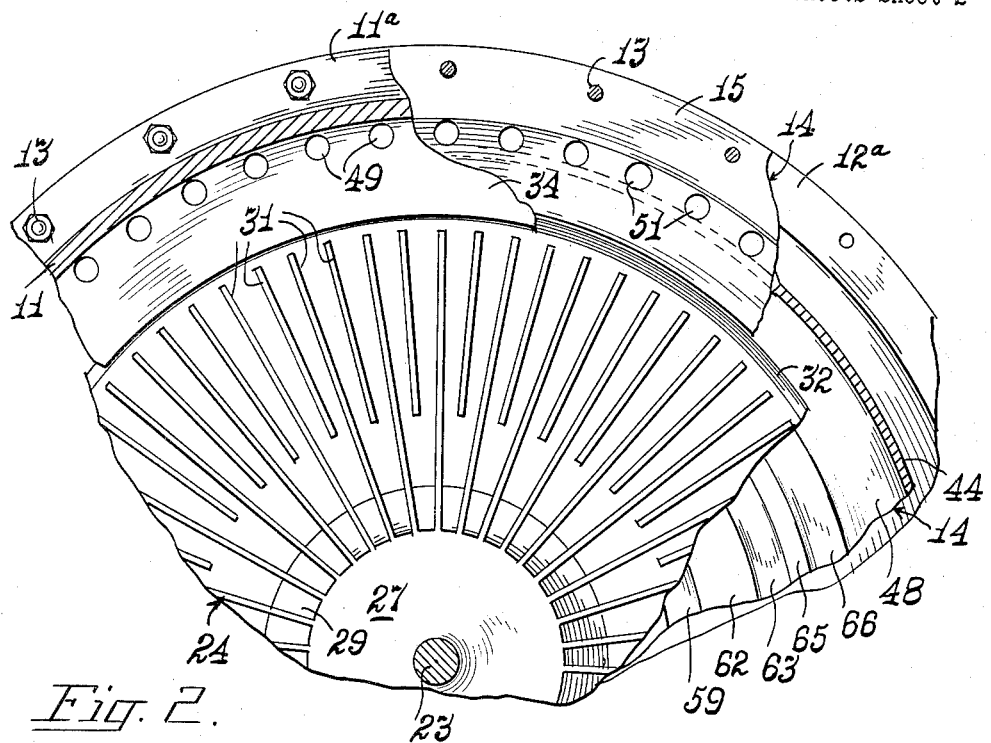
FIG. 2 is a fragmentary sectional view taken substantially on line 2—2 of FIG. 1, showing parts broken away.

Referring to the accompanying drawings and particularly to FIG. 1, the engine is enclosed in a cylindrical housing comprised of a back wall section 11 and a front wall section 12 each externally flanged peripherally as at 11a and 12a respectively, for securement, as by bolts 13, into a unitary structure. A peripherally flanged circular stationary stator 14 is mounted between said housing sections, as shown, and is secured in place rigidly by said bolts 13 which extend through related holes in its peripheral flange 15. The mating surfaces of flanges 11a—15—12a may be machine finished to insure a tight seal and if desired suitable gaskets or other seal means 16 may be sandwiched between the mating surfaces to prevent leakage at the joints. The stationary stator 14 divides the interior of housing 11—12 into an impeller wheel chamber 17 and a circular air pasageway 18.

Preferably, the housing back section 11 includes a base or mounting flange 19 and it has a rearwardly extending axial flange or boss 21, mounting anti-friction bearings 22 which provide journals for a rotary power take-off shaft 23 extended through the boss from the outside and projecting into the interior of the impeller wheel chamber 17. The inner end of said shaft carries an impeller wheel, generally indicated at 24, mounted firmly thereon for rotation therewith. The rearwardly or outwardly projecting end of said shaft is adapted to be connected in any conventional manner to suitable starting means (not shown) which may be manual or mechanical. In order to adjust the shaft longitudinally of its axis, so as to insure proper positioning of the impeller wheel for free rotation in the impeller wheel chamber 17, said shaft has adjusting nuts 25 threaded thereon which bear against a seal ring 26 adjacent one of the anti-friction bearings 22. Rotation of the nuts 25 in either direction relative to the shaft adjusts said shaft in an axial direction.

The impeller wheel 24 comprises a hub portion 27 and a circular body or flange 28, the back face of which is sloped rearwardly, as at 29, to define the circumferential surface of hub 27. As shown, the smallest diameter of hub 27 corresponds to the outside diameter of the housing boss 21. A plurality of mutually spaced circumferentially arranged radial webs 31 are formed integral with the back face of the circular flange 28. These webs are alternately long and short with the longer webs merging with the sloped surface 29 and the shorter webs terminating short of said surface. All of said webs terminate at their outer ends substantially coincident with the outer peripheral edge 32 of said flange 28. As shown, said edge 32 preferably is V-shaped for a purpose to be explained presently.

During rotation of the impeller wheel 24, webs 31 function to impell atmospheric air radially from the central region of said wheel into a circumferential collection chamber 33 defined by the outer peripheral area of the housing back wall section 11 and an internal circular flange 34 formed integral with said section and extending inwardly to locate its chamfered inner edge 35 in substantial contact with, but spaced slightly away from one inclined peripheral surface of the impeller wheel edge 32.

Figure 3:
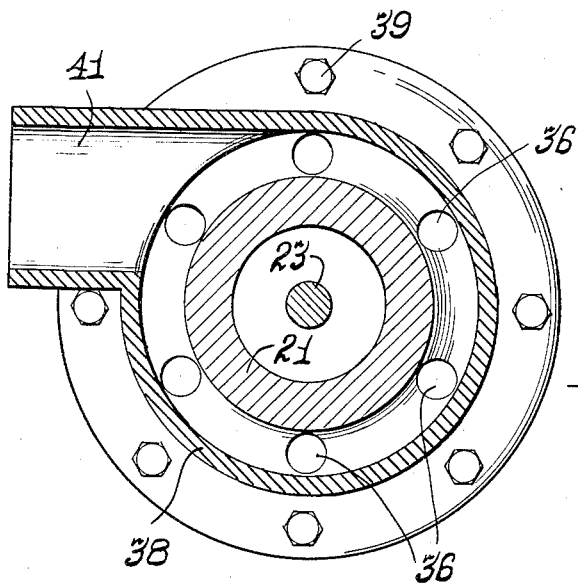
FIG. 3 is a detail sectional view of the air intake, taken on line 3—3 of FIG. 1.

Atmosphere is admitted into the central region of the impeller wheel through a series of ports 36 in the housing back wall. These ports are in direct flow communication with an air chamber 37 defined by a shell 38 fitted over the housing boss 21 and secured to the housing back wall as by machine screws 39. Shell 38 has a tangential air inlet 41 (FIG. 3). Thus it will be observed that atmospheric air entering inlet 41 is drawn through chamber 37 and ports 36 and is impelled radially by webs 31 into circumferential collection chamber 33.

The stationary stator 14, to be described later in greater detail in its relation to the impeller wheel 24, is arranged in face to face relation to said impeller wheel. It includes a circular wall 42 having an axial opening or throat 43 and is secured in place, as previously noted, by flange 15 which is integral with a peripheral wall 44 that extends rearwardly from circular wall 42 and terminates in an internal flange 45 that has face to face abutment with internal housing flange 34. The inner peripheral edge of said flange 45 is chamfered, as at 46, and is spaced slightly from the other inclined peripheral surface of the impeller edge 32. The chamfered edges of flanges 34 and 45 cooperate with the V-shaped peripheral edge 32 of the impeller wheel to provide a small or restricted circumferential passage 47 through which a small proportion of air delivered to the circumferential collection chamber 33 may flow into a circular exhaust chamber 48 provided in part by the outer peripheral wall 44 of stator 14 so as to intermingle with and cool exhaust gases flowing through said exhaust chamber and which are delivered thereinto in a manner to be described presently.

The bulk of the air delivered into circumferential collection chamber 33 passes therefrom through circumferentially spaced registering ports 49—51 in housing flange 34 and mounting flange 15 respectively, and into the circular air passageway 18 where it flows inwardly radially and enters axial throat 43. Air entering throat 43 is, in a manner now to be described, initially pressurized and then mixed with a combustible fuel, which fuel-air mixture is subsequently ignited to produce high pressure exhaust gases which function to drive the impeller wheel and is ultimately delivered into exhaust chamber 48 for discharge to atmosphere.

Referring again to the impeller wheel 24, the front face of its circular body or flange 28 is formed with a plurality of concentric spaced apart rows of vanes or impeller blades 52—52a—52b and power turbine blades 53—53a. Although there are three rows of impeller blades 52 and two rows of power turbine blades 53 shown in the exemplary disclosure, it should be understood that the number of rows is optional and may be increased or decreased to vary the number of stages of compression required of a particular engine designed for a specific power output.

As best shown in FIG. 4 the three rows of impeller blades 52—52a and 52b each comprise concentrically arranged rows of mutually spaced apart vanes that are substantially rectangular in shape and which extend perpendicular to the plane of the body 28 but are inclined circumferentially-radially in a direction opposed to the direction of wheel rotation. The blades in each successive row are progressively reduced in height for a purpose to be explained presently.

The power turbine blades 53—53a also comprise concentrically arranged rows of mutually spaced apart vanes that are substantially rectangular in shape and which extend perpendicular to the plane of body 28 and which also are inclined circumferentially-radially in a direction opposed to the direction of wheel rotation. The blades 53 in each successive row are progressively increased in height for purposes to be explained presently. The rows of vanes 52 occupy the inner circular area of the body 28 whereas the rows of vanes 53 occupy the outer peripheral area of the body.

The face of stator 14 opposed to the face of the impeller body 28 carrying vanes 52 and blades 53 is formed with concentric ribs and spaces therebetween arranged to co-act with the vanes and blades. Specifically, in the exemplary disclosure, the central area of stator 14, adjacent to its throat 43, is formed with a first concentric rib 54 and a second concentric rib 55 defining a circular channel 56 between them and into which the innermost row of impeller blades 52 extends. A third concentric rib 57 on said stator is spaced outwardly radially of rib 55 to define a second circular channel 58 into which the next row of impeller blades 52a extends. Similarly, the next succeeding row of impeller blades 52b extends into a circular channel 59 provided between the third concentric rib 57 and one side wall 61 (FIG. 4) of an annular combustion chamber 62 formed in the stator. The successive reduction in the height of the blades 52, 52a and 52b and of their related channels increases the compressive action at each stage of compression.

The power turbine blades 53 are likewise extended into circular channels formed on the stator. As best shown in FIG. 1, the smaller or first row of turbine blades 53 extends into a channel 63 defined by the other side wall 64 of said combustion chamber and a concentric rib 65, whereas the outermost row of turbine blades 53a extends into an annular recess 66 outwardly of rib 65, which recess is in direct communication with exhaust chamber 48.

Each of the ribs 54, 55, 57, 65, as well as the combustion chamber walls 61 and 64, is formed with mutually spaced radial passageways 67, 68, and 69 respectively. Each of these passageways is inclined circumferentially in the direction of wheel rotation and each comprises a nozzle. The operation of the impeller wheel with its vanes and blades is such that, during rotation of the wheel, incoming air entering throat 43 flows initially through the passageways 67 in the innermost rib 54. The air flow is entrained and pressurized by vanes 52. It is discharged outwardly radially through passageways or nozzles 67 in the next adjacent rib 55 into the path of the next row of vanes 52a which further pressurizes the stream and ejects it through the passageways or nozzles 67 in the next rib 57 and into the path of the next succeeding row of vanes 52b. The pressurized air continues to flow outwardly-radially by action of the last named row of vanes 52b and it flows under pressure through inlet ports 69 in one wall of the combustion chamber 62. It should be apparent at this time that the air flowing to combustion chamber 62 is highly pressurized because of the successive stages of compression by vanes 52, 52a and 52b.

The combustion chamber 62 has a fuel injector 71 in communication therewith for admitting liquid or gaseous combustible fuels which mixes with the pressurized air in the combustion chamber. The pressurized fuel-air mixture is ignited by sequential operation of an ignitor 72 which may be of any conventional construction and operable in response to operation of any type of electrical system common to internal combustion engines.

The high pressure gases of combustion leave the combustion chamber through the radial circumferentially inclined outlet ports or nozzles 69 in the other wall of combustion chamber 62 and impinge upon the first adjacent row of power turbine blades 53 to drive the impeller wheel. The high pressure exhaust gases, upon passing clear of blades 53 enter and flow through circumferentially inclined passages or nozzles 68 in rib 65 so as to impinge against the outermost row of turbine blades 53a to further power the impeller wheel and pass into exhaust chamber 48, and then to atmosphere through an exhaust port 73.

It should be apparent at this time that incoming air flowing between the impeller webs 31 is pressurized and flows through ports 49—51 and around exhaust chamber 48 and then inwardly radially across the outside face of the stator 14. It is preheated during this flow by the transfer of the heat of the combustion gases thereto so that when it enters axial throat 43 it is of a temperature most suitable for combustion when mixed with the fuel in the combustion chamber. Also, the passage of a small quantity of air from the collection chamber 33 through the gap 47 at the peripheral edge of the impeller wheel serves to further reduce the temperature of the gases in the exhaust chamber 48. As a consequence, the heat of the exhaust gases is greatly reduced. Preferably, the wall 42 of the stator may have radial heat dissipating webs 74 thereon, for further preheating of the air supplied to the combustion chamber so as to increase the efficiency of the engine.

In order to start operation of the engine, a suitable starter, not shown, may be operatively connected with the impeller shaft 23 for rotating the latter and initiating the flow of air into the engine. Alternately, pressurized air from an outside source may be forced directly into air inlet 41. As soon as fuel and pressurized air is delivered into the combustion chamber 62 and the injector and ignitor systems are placed in operation, the engine will be driven by the high pressure gases of combustion passing through the exhaust nozzle passageways 69 in the combustion chamber wall and in the outermost nozzle ring or rib 65.

If desired, a spring loaded control valve 75 may be mounted in the wall of the housing portion 12 to control the maximum pressure required to supercharge the compressor. Its structure and operation is such that whenever the volume of pressurized air produced by the increased speed of the compressor exceeds the volume required to supercharge same, the valve 75 will open to allow excess, pressurized air to be expended to atmosphere or through a conduit 76 into the exhaust chamber 48 to further cool the exhaust gases therein.

Obviously the torque or power output can be increased by enlarging the diameter of the turbine engine and locating a second circumferential combustion chamber similar to the one now provided but without an ignitor, between the successive stages of the power turbine blades 53 and by injecting a fuel-air mixture directly into the hot gases in the second combustion chamber, thus affording additional combustion and stepped up pressure to propel the successive power turbine blades.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a high compression supercharged internad combustion turbine engine, a housing having an axial air inlet, a shaft journalled in said housing, an impeller wheel rotatable with said shaft, a stator mounted in said housing and dividing it into an impeller chamber and a free flow air chamber, means on said impeller wheel for pressurizing air entering the air inlet and delivering it into a peripheral collection chamber during rotation of said impeller wheel, passageways in the housing to admit the pressurized air from the collection chamber into the free flow air chamber, an axial air passage in the stator connecting the free flow air chamber with the impeller wheel chamber, complemental means on the impeller wheel and on the stator to pressurize air entering said impeller wheel chamber and directing it in a radial direction, an annular combustion chamber in said stator and into which the pressurized air is delivered, a fuel injector for delivering fuel to said combustion chamber, an ignitor operable to ignite the fuel-air mixture in said combustion chamber, radial circumferentially inclined nozzles through which high compression gases of combustion are discharged, and power turbine blades on the impeller wheel in the path of gases ejected through said nozzles.

2. The turbine engine of claim 1, in which the complemental means for pressurizing the air comprises concentric rows of vanes on the impeller wheel and concentric rows of nozzles on the stator interposed between said vanes for directing the air flow to said vanes in a circumferentially inclined direction radially.

3. In a high compression supercharged internal combustion turbine engine, a housing having a cylindrical chamber in communication with atmosphere, a partition dividing said housing into an impeller chamber and a free flow air chamber, an impeller wheel mounted in the impeller chamber, vanes on said impeller wheel to direct air entering the housing into the peripheral region of the impeller chamber when the impeller wheel is rotated, air flow passages between said peripheral region and the free flow air chamber, said partition having an axial air inlet, an annular combustion chamber in said partition concentric with the axial air inlet, means on the impeller wheel and on the partition for pressurizing air entering the air inlet and delivering it radially outwardly to the combustion chamber when the impeller wheel is rotated, means to admit fuel to the combustion chamber for mixing with the pressurized air therein, means to ignite the air-fuel mixture, means on the impeller wheel and on the partition defining a tortuous path for pressurized exhaust gases from the combustion chamber so as to rotate the impeller wheel, and a power take-off shaft on said impeller wheel.

4. In a high compression supercharged internal combustion turbine engine, a housing having a cylindrical chamber in communication with atmosphere, a shaft journalled axially in said housing, an impeller wheel in the housing mounted on said shaft, means on said impeller wheel for pressurizing air entering the housing and directing it into a peripheral collection chamber, a circular stator having an axial air inlet arranged in said housing in opposed relation to and spaced from one face of the impeller wheel, means to direct air from the collection chamber to said air inlet, an annular combustion chamber in said stator concentric with and spaced from the air inlet, concentric rows of circumferentially spaced circumferentially inclined radial vanes on said impeller wheel face inwardly radially of the combustion chamber, a plurality of concentric rows of circumferentially spaced circumferentially inclined radial nozzles on the opposed face of the stator, one row associated with each row of vanes for directing air entering the air inlet and flowing through the nozzles into the path of said vanes, said vanes being adapted when the impeller wheel is rotated to further compress the air and deliver the pressurized air into the combustion chamber, means to admit combustible fuel into the combustion chamber to be mixed with said pressurized air, means to ignite the pressurized air-fuel mixture, a plurality of circumferentially spaced exhaust nozzles leading from said combustion chamber for directing pressurized exhaust gases outwardly radially, means on the impeller wheel in the path of said pressurized gases to cause the impeller wheel to be rotated by the pressure of said gases, and an exhaust chamber at the periphery of said stator, said exhaust chamber lying in the path of air flowing from the collection chamber to said air inlet so as to cause preheating of the air by the heat of exhaust gases in said exhaust chamber.

5. In a high compression supercharged internal combustion turbine engine, a housing having a cylindrical chamber in communication with atmosphere, a shaft journalled axially in said housing, an impeller wheel in the housing mounted on said shaft, means on said impeller wheel for pressurizing air entering the housing and directing it into a peripheral collection chamber, a circular stator having an axial air inlet arranged in said housing in opposed relation to and spaced from one face of the impeller wheel, means to direct air from the collection chamber to said air inlet, an annular combustion chamber in said stator concentric with and spaced from the air inlet, concentric rows of circumferentially spaced circumferentially inclined radial vanes on said impeller wheel face inwardly radially of the combustion chamber, a plurality of concentric rows of circumferentially spaced circumferentially inclined radial nozzles on the opposed face of the stator, one row associated with each row of vanes for directing air entering the air inlet and flowing through the nozzles into the path of said vanes, said vanes being adapted when the impeller wheel is rotated to further compress the air and deliver the pressurized air into the combustion chamber, means to admit combustible fuel into the combustion chamber to be mixed with said pressurized air, means to ignite the pressurized air-fuel mixture, a plurality of circumferentially spaced exhaust nozzles leading from said combustion chamber for directing pressurized exhaust gases outwardly radially, and means on the impeller wheel in the path of said pressurized gases to cause the impeller wheel to be rotated by the pressure of the exhaust gases.

6. In a high compression supercharged internal combustion turbine engine, a housing having a cylindrical chamber in communication with atmosphere, a shaft journalled axially in said housing, an impeller wheel in the housing and mounted on said shaft, a circular stator having an axial air inlet arranged in said housing in opposed relation to and spaced from one face of the impeller wheel, an annular combustion chamber in said stator concentric with and spaced radially outwardly from the air inlet, concentric rows of circumferentially spaced radial vanes on said impeller wheel face inwardly radially of the combustion chamber, a plurality of concentric rows of circumferentially spaced nozzles on the opposed face of the stator, one row associated with each row of vanes for directing air entering the air inlet into the path of said vanes, said vanes being adapted when the impeller wheel is rotated to pressurize the air and deliver it into the combustion chamber, means to admit combustible fuel into the combustion chamber to be mixed with said pressurized air, means to ignite the pressurized air-fuel mixture, exhaust nozzles leading from said combustion chamber for directing pressurized exhaust gases outwardly radially, and means on the impeller wheel in the path of said pressurized gases to cause the impeller wheel to be rotated by the pressure of said exhaust gases.

7. The turbine engine of claim 6, in which the means on the impeller wheel in the path of the pressurized exhaust gases comprises radial turbine blades inclined in a circumferential direction.

8. In a high compression supercharged internal combustion turbine engine, a housing having a cylindrical chamber in communication with atmosphere, an impeller wheel mounted in said chamber, a circular partition in said housing arranged in face to face relation to the impeller wheel and having an axial air inlet, an annular combustion chamber radially outwardly of and concentric with the axial air inlet, means on the impeller wheel and on the partition for pressurizing air entering the air inlet and delivering it into the combustion chamber when the impeller wheel is rotated, means to admit fuel to the combustion chamber for mixing with the pressurized air therein, means to ignite the air-fuel mixture, outwardly radially directed exhaust ports in the combustion chamber, and complemental means on the impeller wheel and on the partition defining a tortuous path for pressurized exhaust gases from the combustion chamber so as to rotate the impeller wheel.

9. The turbine engine of claim 8, in which the means for compressing the air comprises concentric rows of vanes on the impeller wheel and concentric rows of nozzles on the partition for directing the air flow to said vanes in a circumferentially inclined direction radially.

10. The turbine engine of claim 8, in which the means defining said tortuous path comprises turbine blades on the impeller wheel and nozzles on the stator.

11. The turbine engine of claim 10, in which the turbine blades are arranged in radially spaced concentric rows and the nozzles are arranged between said rows.

References Cited in the file of this patent

UNITED STATES PATENTS

| | | |
|---|---|---|
| 1,868,143 | Heinze | July 19, 1932 |
| 2,589,239 | Fallon | Mar. 18, 1952 |